July 13, 1926.

W. F. WEIDMAN

WINDSHIELD

Filed Jan. 5, 1923   2 Sheets-Sheet 2

1,592,168

W. F. Weidman, Inventor

By C. A. Snow & Co.
Attorneys

Patented July 13, 1926.

1,592,168

UNITED STATES PATENT OFFICE.

WALTER FRANKLIN WEIDMAN, OF EASTON, PENNSYLVANIA.

WINDSHIELD.

Application filed January 5, 1923. Serial No. 610,822.

This invention relates to a windshield for automobiles and is designed primarily for use in protecting the occupants of the rear seat of the vehicle.

One of the objects of the invention is to provide a windshield which can be connected readily to the bows of the vehicle top and which, when not in use, can be swung upwardly toward the top and be supported out of the way.

Another object is to provide a windshield made up of materials that will bend easily when subjected to unusual strains, thus avoiding injury to the occupants such as might be caused by the breaking of a windshield formed of brittle or unyielding parts.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit of the invention.

In the accompanying drawings the preferred form of the invention has been shown.

Figure 1:
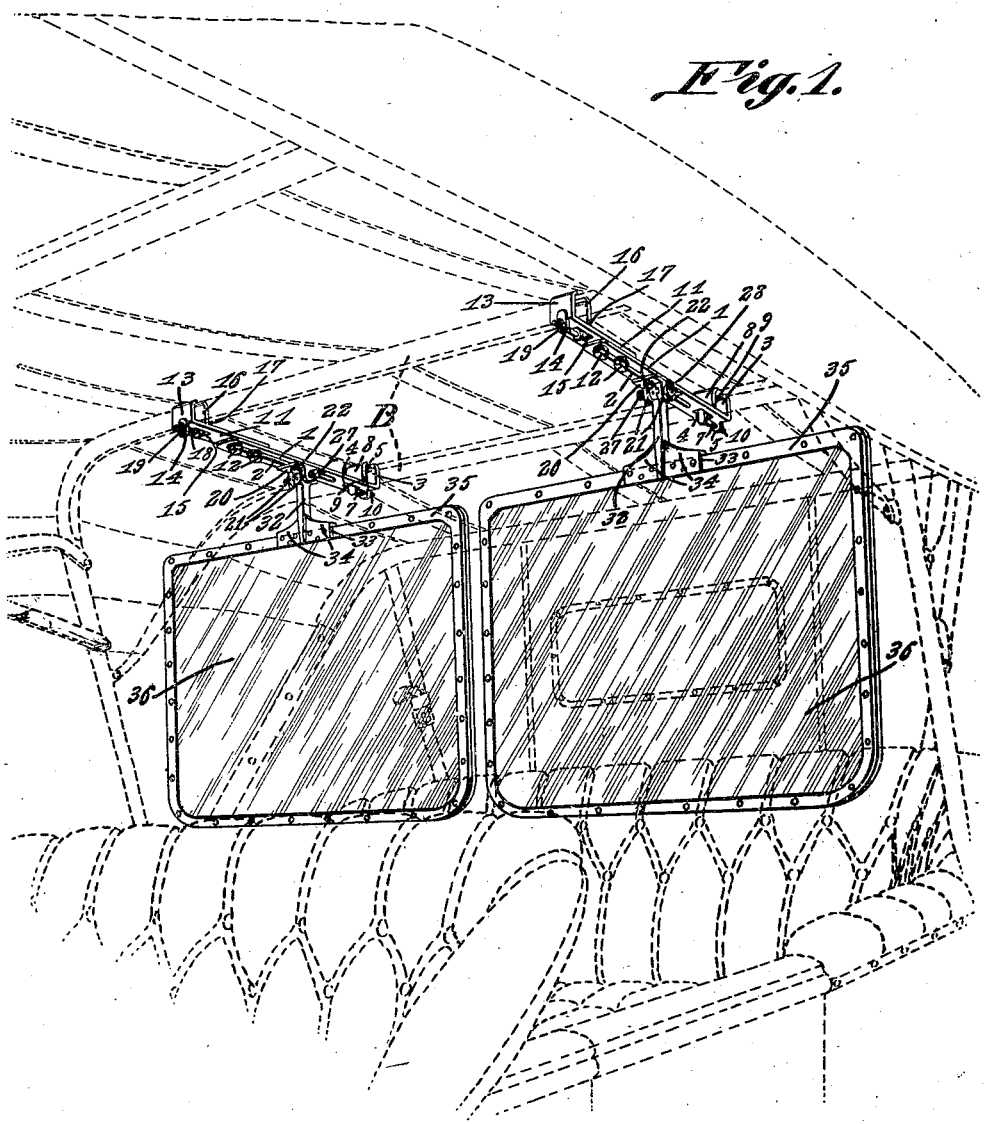
Figure 1 is a perspective view of a pair of windshields in position for use, a portion of a vehicle body being shown by broken lines.

Referring to the figures by characters of reference 1 designates one of the members of the attaching device, this member being in the form of an elongated strip having a longitudinal slot 2 extending close to one end thereof. A jaw 3 is extended from the other end of the strip and a slot 4 is located near this jaw. An ear 5 is extended downwardly from the strip close to jaw 3 and has an opening 6 therein in which is slidably mounted a threaded stem 7 projecting from a jaw 8 slidable in slot 4. This jaw has shoulders 9 slidably engaging the strip 1. A nut 10 engages stem 7 and by tightening it the jaw 8 will be drawn toward jaw 3, thus to grip an object place between the jaws.

Another member 11 is adjustably connected to the member 1 and comprises a strip with clamping bolts 12 mounted within the slot 2. By loosening these bolts member 11 can be adjusted along the member 1 and by tightening the bolts the parts can be fastened to prevent relative movement.

Member 11 has a jaw 13 extending from its outer end, there being an ear 14 adjacent this jaw. A short slot 15 is provided in member 11 near jaw 13 and a slidable jaw 16 is mounted in this slot and has shoulders 17 adapted to engage member 11. A threaded stem 18 projects from jaw 16 and is slidable in ear 14 and is engaged by a nut 19. By tightening this nut the jaw 16 can be adjusted toward jaw 13.

A bracket 20 having spaced ears 21 depending therefrom is adjustably connected to the member 1 by clamping bolts 22 adjustably mounted within the slot 2 in member 1.

Extending transversely through the ears 21 is a pin 23 having an intermediate shoulder 24 from which is extended a reduced screw threaded portion 25. A spring is interposed between one of the ears 21 and the head 27 of the pin. This spring serves to hold the pin yielding normally in one position and a nut 28 is adjustably mounted in the reduced portion of the pin for limiting the movement of the pin under the action of the spring.

Fastened to the pin 23 and bearing against the shoulder 24 is an eye 29 provided on one side with spaced lugs 30. The ear 21 nearest these lugs has intersecting grooves 31 therein. The lugs 30 are adapted to be seated in either of these grooves.

A hanger 32 is extended from the eye 29 and has a fork 33 at its lower end. Seated in this forked portion of the hanger, which is formed with laterally extending channelled wings 34, are frames 35 preferably formed of aluminum or other material that will bend readily. The frames are clamped upon and secured to the marginal portion of a transparent sheet 36 formed preferably of celluloid or other material of a non-brittle nature.

In using this windshield the members 1 and 11 are adjusted so that the jaws 3 and 13 will lap a pair of bows B of a vehicle top, The jaws 8 and 16 are then adjusted toward jaws 3 and 13 so as to clamp the jaws B. Thus the windshield will be properly supported and if it is desired to arrange the transparent portion 36 in hanging position the nut 28 is tightened so as to draw the lugs 30 into the vertical groove 31 in ear 21. Should it be desired to support the windshield in a raised position, nut 28 is loosened and spring 26 will withdraw lugs 31 from engagement with ear 21. The windshield can then be swung upwardly under the vehicle top and by then tightening nut 28 the lugs 30 will be drawn into the horizontal groove 31.

Figure 2:
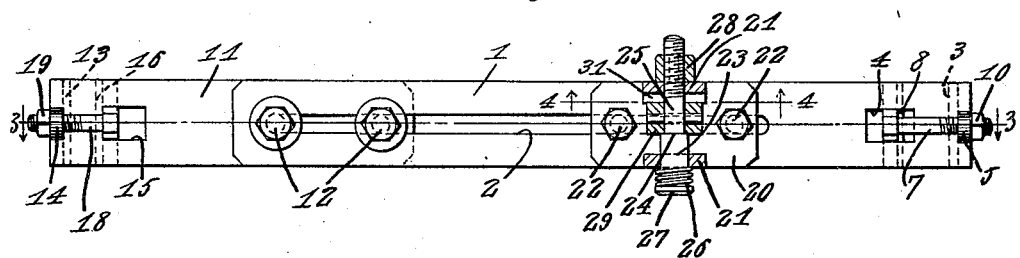
Figure 2 is a bottom plan view of one of the attaching members, the hanger being shown in section, the section being taken on line 2—2, Figure 3.
Figure 3:
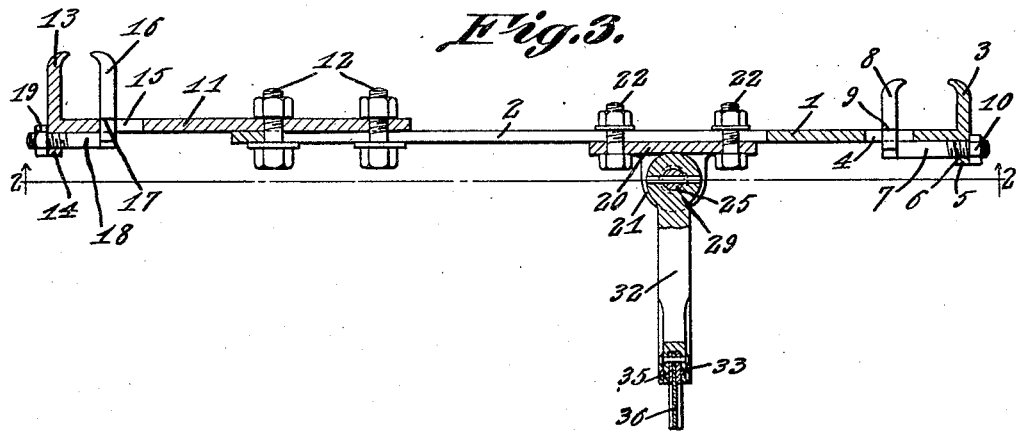
Figure 3 is a section on line 3—3, Figure 2.
Figure 4:
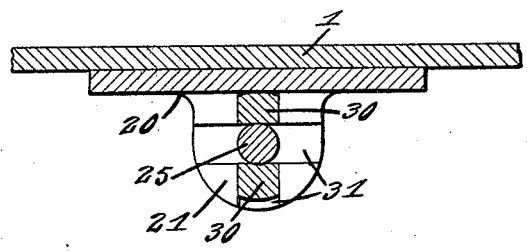
Figure 4 is an enlarged section on line 4—4, Figure 2.

As shown in Figures 1 and 2 the windshield can be arranged in front of the rear seat. Either or both of the windshields can be supported in an active position or in a raised position. The construction of the device is such that it can be applied readily, will not easily get out of order, and will not work loose and rattle. Furthermore should the windshield be subjected to a sudden blow or unusual strain it would not fracture, but would crumple and thus avoid injury to persons seated behind the windshield.

What is claimed is:

1. The combination with adjustably connected members, jaws thereon, and adjustable jaws mounted on the members, the jaws cooperating for engaging the bows of a vehicle top, of an angularly adjustable hanger connected to the members, a transparent portion supported by the hanger, and means for holding the hanger against movement when in either of two positions.

2. The combination with adjustably connected members, and cooperating jaws on the member for engagement with bows of a vehicle top, of a hanger pivotally connected to the members, a transparent portion supported by the hanger, and means for holding the hanger in either of two positions relative to the jaw carrying members.

3. The combination with adjustably connected members and jaws thereon for engagement with the bows of a vehicle top, of a bracket adjustably connected to the members and having spaced ears, there being intersecting grooves in one of the ears, and an eye pivotally mounted between the ears, a lug thereon, and means for shifting the eye to position the lug in either of the grooves, a hanger extending from the eye, and a transparent portion carried by the hanger.

4. The combination with a bracket, and spaced adjustably connected jaws arranged in pairs and cooperating for engagement with bows of a vehicle top, said bracket being adjustably connected to the jaws, of an angularly adjustable hanger supported by the bracket, a transparent portion supported by the hanger, and a frame for said portion, said frame and transparent portion being formed of a bendable material which will not fracture.

In testimony that I claim the foregoing as my own, I have hereto affixed my signature.

WALTER FRANKLIN WEIDMAN.